_United States Patent Office_

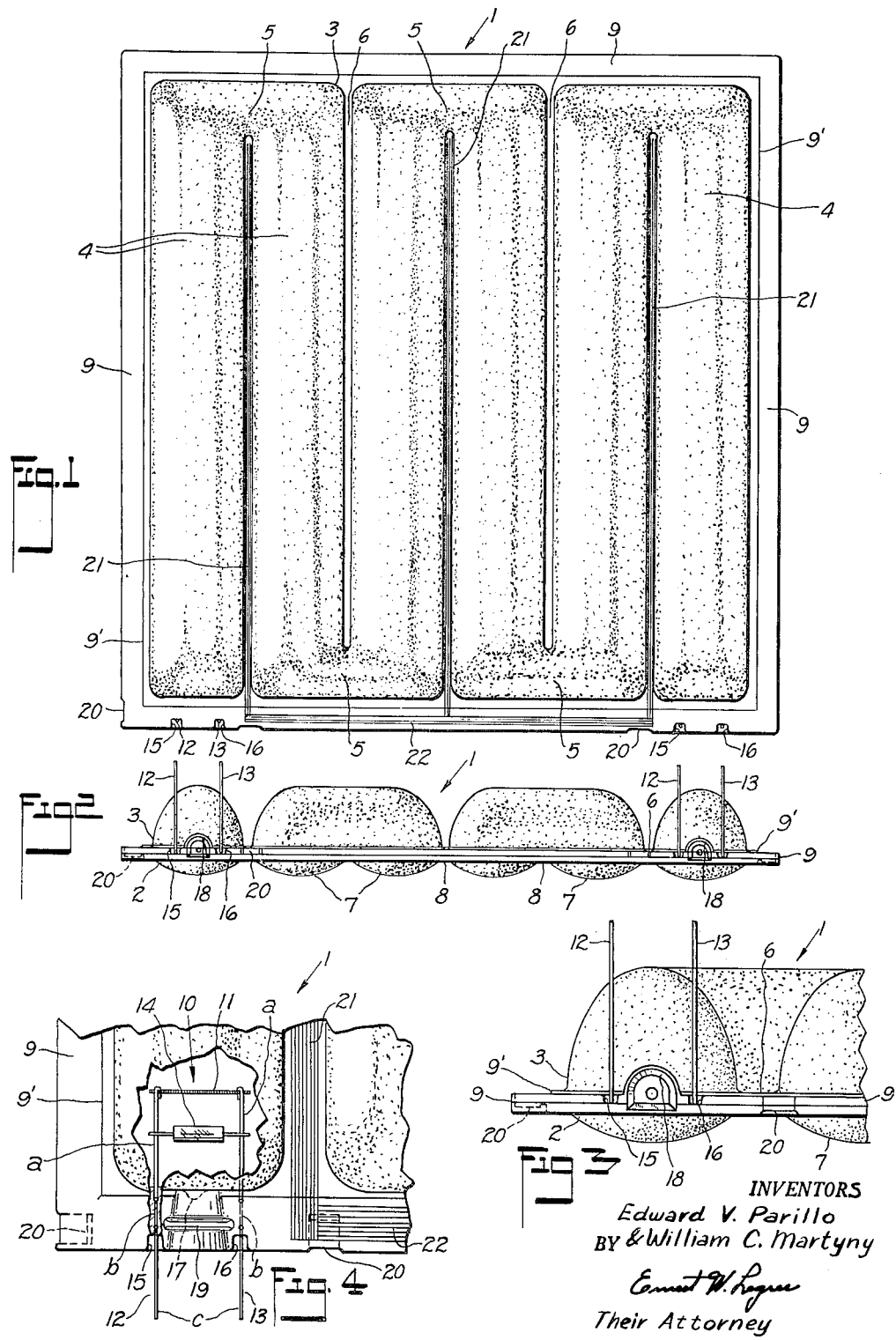

3,237,042
Patented Feb. 22, 1966

3,237,042
PANEL LAMP INLEAD STRUCTURE HAVING A NOTCHED EDGE FOR LEAD-IN CONDUCTORS
William C. Martyny, Lyndhurst, and Edward V. Parillo, East Cleveland, Ohio, assignors to General Electric Company, a corporation of New York
Filed May 1, 1961, Ser. No. 106,828
6 Claims. (Cl. 313—204)

This invention relates to fluorescent panel lamps and more particularly to the inlead structure or arrangement therefor.

In fluorescent panel lamps, the discharge is a labyrinthine discharge channel formed between two vitreous components sealed together along their margins. Such lamps provide a relatively long discharge in a small area which is an advantage from the point of view of compactness of source and ease of handling. They offer what may be described as an area light source as against a line source as is the case with the usual elongated fluorescent lamp.

In many of the applications presently visualized for a panel lamp, it is intended that only one face of the lamp be exposed to view. For instance it is contemplated that panel lamps be made in modular sizes corresponding to the dimensions of standard ceiling tiles. Alternatively, it is contemplated that panel lamps be used in shallow fixtures. In either case, the lower plate, which may be referred to as the faceplate of the lamp, is exposed to view and it is desired that no connectors or inleads or irregularities in the glass surface on account of the inleads mar its appearance. Also to carry through the modular concept, the base or terminal structure must fit within the modular dimensions and not project beyond them in order to permit the closest possible edge-to-edge mounting of the lamps.

The panel lamp with which the present invention is particularly concerned is formed by sealing two molded glass plates, the faceplate and the backplate, together along their margins. The backplate, which forms the upper side in the normal mounting of the lamp, is molded to define, in cooperation with the faceplate, a labyrinthine discharge channel. The faceplate may be provided with a plurality of shallow embossments of square outline giving it somewhat the appearance of a quilt or checkerboard. The flat areas or lands of glass at the base of glass partitions between channelways in the backplate are designed to seat on corresponding flat areas or lands between embossments in the faceplate. The two plates are sealed together along their overlapping margins to provide a fused ledge seal of high strength which is desirably made in accordance with the teachings of the copending application of Richard S. Christy, Serial No. 106,829, filed of even date herewith, entitled Panel Lamp and Manufacture Thereof, and assigned to the same assignee as the present invention. The electrode inleads are sealed through the ledge seal and are embedded along the juncture of the overlapping margins of glass which form the ledge seal.

The above-described arrangement has some features which are undesirable when the inleads are brought out to the very edge or periphery of the lamp. They may be broken off as a result of abuse in handling the lamp. Furthermore, to guard against shock hazard to personnel, it is necessary to provide an insulating covering over them. This is difficult to do under the desideratum of staying within the modular dimensions of the lamp.

The object of the invention is to provide a solution to the above-outlined problem.

A more specific object of the invention is to provide an arrangement or structure whereby the electrode inleads may be sealed through the ledge seal of a panel lamp but which will not require the use of insulators projecting beyond the square peripheral outline of the lamp for protection of the inleads and elimination of shock hazard.

In accordance with our invention, we provide a simple and practical solution to the problem by forming a lateral notch in one of the margins of the ledge seal at the place of sealing in the inleads. Preferably a blind notch is used whereby after sealing, the inleads may be turned up through the notch without being taken all the way to the outer edge of the lamp. Normally the notches are made in the backplate and the inleads are turned up towards the back of the lamp. However the reverse arrangement may likewise be used with the notches formed in the faceplate. It is also possible to use a full notch through both plates.

For other features and for further objects and advantages of the invention, attention is now directed to the following description of a preferred embodiment to be taken in conjunction with the accompanying drawing. The features of the invention believed to be novel will be more particularly pointed out in the appended claims.

In the drawing:

FIG. 1 is a plan view of a square panel lamp showing the notches formed in the margin of the backplate.

FIG. 2 is a side or end view of the lamp with reference to FIG. 1.

FIG. 3 is a fragmentary end view to a larger scale to show the emergence of the inleads through the notches.

FIG. 4 is a fragmentary plan view corresponding to FIG. 3 partly sectioned through the ledge seal along one of the inleads to show the construction.

Referring to the drawing, there is shown at 1 a six-channel fluorescent panel lamp in the form of a generally flat square panel made up of a pair of complementary molded glass components or plates 2, 3. The lower component 2 forms the underside or faceplate of the lamp which is exposed to view when the lamp is mounted in its fixture or incorporated into a ceiling. The upper component 3 which may be referred to as the backplate is molded or blown to define, in cooperation with the faceplate, a winding or labyrinthine discharge channel or passage by means of six parallel grooved sections or channelways 4 extending side-by-side and joined together by loops 5 at alternate ends where the lengthwise partitions 6 end, thereby forming a continuous grid-like channel. Both plates may be formed from flat sheets of glass by any suitable means, for instance by pressing or by vacuum molding. The faceplate 2 is provided with a plurality of shallow embossments 7 which may be of square outline in plan view, giving it somewhat the appearance of a quilt or checkerboard. The quilting of the faceplate improves the appearance and increases the strength of the assembly. The internal surfaces of the plates are coated with a phosphor, indicated generally by the stippling. Desirably the phosphor coating extends over the entire faceplate including the lands or flat areas 8 between embossments which are engaged by the partitions 6 in the backplate. This may be done by phosphor coating and lehring the plates prior to sealing together, in accordance with the teachings of copending application Serial No. 106,822, filed of even date herewith, of William C. Martyny, entitled Fluorescent Panel Lamp and Coating Process Therefor, and assigned to the same assignee as the present invention.

The edges of the faceplate and the backplate are hermetically sealed and fused together to form a solid ledge seal running around the four sides of the lamp. This may be done following the teachings of the aforementioned application of Richard S. Christy by heating the glass above its strain point but not to conventional softening temperature and applying a very high pressure to the margins causing lateral flow of glass with formation of a rounded fillet at the internal juncture of the glass surfaces. In the case of lime glass, the sealing temperatures and pressures used per the Christy invention may be in the range of 600 to 700° C. and 2000 to 4000 pounds per square inch, respectively. Along the internal junctures between partitions 6 in the backplate and lands 8 in the faceplate, the glass surfaces are merely pressed into close conformance by the application of relatively low pressure but not sealed or fused together. Provided there is close tight fit or conformance of the glass surfaces along the junctures, the electric discharge or arc will not leak through and short-circuit at these partitions but will follow the labyrinthine channel through from end-to-end. The presence of phosphor between the glass surfaces at the junctures greatly improves the appearance of the faceplate and is also useful to prevent fusion and sticking of the glass surfaces at the junctures.

The lamp is provided with discharge supporting electrodes indicated generally at 10 at opposite ends of the channel. Each electrode comprises a coiled coil filament 11 of tungsten wire coated with alkaline earth electron-emitting oxide (carbonates prior to activation). The filament is supported across the hooked ends of inleads 12, 13 each of which comprises a nickel inner section "$a$," a dumet (copperclad nickel iron) section "$b$" and a copper outer section "$c$." The dumet matches substantially the expansion coefficient of the glass and is the part which makes the hermetic seal. The three sections of each lead are welded together and the welding operation generally forms slight thickenings or knots at the junctions of the sections. The glass bead bridge 14 is a spacer and stiffener to prevent strain on the filament, particularly during handling prior to sealing into the vitreous lamp assembly. The electrodes are preferably of the low thermal capacity rapid start type which are heated at starting and during operation by passing current therethrough, but other types of electrodes may of course be used.

In accordance with our invention, the margin of at least one of the plates, the backplate in this instance, is notched inwardly from the outer edge, forming a blind notch partly through the ledge seal, as indicated at 15, 16. This permits the outwardly projecting ends of the inleads, that is the copper sections "$c$" of the inleads 12, 13 to be turned up for connection to base terminals or to other conductors leading to a current regulating power supply or ballast. Thus our invention avoids taking the inleads all the way to the outer edge of the fused ledge seal where they would have to be guarded and insulated in order to avoid a shock hazard. The need for exposed and easily damaged insulation projecting beyond the modular outline of the panel lamp is thereby likewise avoided.

The notches 15, 16 in the backplate are preferably formed prior to sealing the plates together. This may be accomplished at the time when the plate is cut from a hot sheet of glass or alternatively it may be done subsequently when the plate is cold, by the use of a diamond saw. It is also possible to use an air-entrained jet of silica powder to cut out the notch after the plates have been sealed together, but this is a laborious way of doing it. Preferably, in accordance with the teachings of the aforementioned Christy application, the electrode inleads are sealed through the ledge seal at the same time as it is formed. To accomplish this, the electrodes are inserted between the plates prior to sealing and with the dumet sections of the inleads passing between the glass margins in line with the notches. The glass margins are then pressed or squeezed together at relatively low temperatures but at very high pressures in order to form a fused solid ledge seal 9 with a rounded fillet at the juncture of the internal glass surfaces. The glass is extruded slightly and reduced in thickness, leaving a slight step seen at 9'. The ledge seal is solid fused glass from about line 9' to the outer edge. Desirably, the dumet sections "$b$" of the inleads, and also the knots or weld junctions, are disposed entirely within the ledge seal between the rounded fillet at the inner edge and the backside of the notch at the outer edge. This serves to anchor the inleads more firmly in place and provides better support for the nickel sections "$a$" on the inside which support the filament 11. Also it assures that only the copper sections "$c$" project out of the glass so that the bends to take the leads up and out of the notches occur entirely in the ductile copper sections.

The lamp contains an ionizable atmosphere including a starting gas or mixture of one or more of the inert rare gases of Group O of the Periodic Table at a low pressure, for instance argon at a pressure of 0.5 to 5, preferably 2 to 3, millimeters of mercury, along with mercury vapor. The quantity of mercury added exceeds that vaporized during normal operation of the lamp wherein it exerts a partial pressure in the range of 2 to 10 microns, more commonly 5 to 8 microns for optimum generation of 2537 A. radiation. This radiation energizes the phosphor coating applied to the inside surfaces of the plates, which phosphor in turn produces visible light. The exhaust, gas filling and tipping-off of the lamp may also be done in accordance with the teachings of the aforementioned Christy application by means of exhaust passageways or ports indicated generally at 17 which are formed directly in the ledge seal of the lamp during the sealing of the plates together. Exhaust and gas fill may then be accomplished through these exhaust passageways by contacting their rims with the forward tips or noses of heated metal exhaust tubes pressed sufficiently hard against the rims to cause some plastic flow of glass at the junctures. The lamp is then tipped-off by collapsing the walls of the passageways by heating with hard sharp flames. The tipping-off may be assisted through the use of heated blades pressed down into the glass above the passageways to form blade-notches in the ledge seal transverse to the passageways and effectively sealing them off, as indicated at 19. The upstanding lips 18 left by the engagement of the tips of the metal exhaust tubes with the rims of the exhaust passageways may be left as they are, or collapsed down into the ledge seal by playing hard sharp flames on them, assisted by mechanical pressing if desired.

The furrowed notches at 20 in the ledge seal on the faceplate side are for the purpose of attaching bases to the ledge seal on the backplate side by means of metal clips. Such bases may be of the kind described and claimed in copending application Serial No. 106,827, of Albert F. Pate, Robert A. Kuebler and Harold R. Kestner, filed of even date herewith, entitled Panel Lamp Base, and assigned to the same assignee as the present invention. They are placed near each end of the marginal ledge seal and overlie the blind notches 15, 16 through which the inleads 12, 13 emerge. The inleads may then be taken directly up through the base structures and attached to their terminals or contact pins and no further insulation of the inleads need be provided.

If it is desired to use other types of bases or connectors, the inleads may be insulated by slipping insulating sleeves over them. They may then be bent back along the backplate side of the ledge seal without ever appearing on the faceplate side or projecting beyond the modular outline or margin.

It is preferred to use a blind notch, that is a notch going through one plate margin only. However one may also use a full notch going through both plates, and the inleads may then be turned either way as desired, away from whichever side or face of the lamp is to be exposed to view.

In order to facilitate starting, it is frequently desirable to have a conductive member, sometimes known as a starting aid or strip, disposed in capacitive relationship to the discharge channel of the lamp. Such a member is conveniently provided in the form of conducting strips 21 which are applied to the outside of the backplate over the partitions 6, that is in the valleys between the channelways 4. As illustrated, the conductive strips are applied in three of the valleys, the two outer valleys and the middle valley. All the strip sections are joined together by another strip 22 which overlies the ledge seal 9 on the electrode side of the lamp. The strips may be of any suitable conductive material which may be adhered to the glass, for instance a silver paint or a graphite suspension or if preferred a vapor deposited metal layer. Another material which may be used is a self-adhesive tape provided with a conductive metal backing. Connection to the strip 22 overlying the marginal ledge may be made by means of the same connector as is used to engage the base terminals.

While a specific embodiment of the invention has been illustrated and described in detail, same is intended by way of example only. Modifications will readily occur to those skilled in the art and it is intended by the appended claims to cover any such as fall within the true spirit and scope of the invention.

What we claim as new and desire to secure by Letters Patent of the United States is:

1. A sealed electric device comprising an envelope formed by a pair of vitreous plates defining an enclosure and fused together along overlapping margins to provide a vitreous ledge seal, a pair of inlead conductors sealed through said vitreous ledge seal between said overlapping margins, at least one of said margins being notched inwardly above said inleads whereby the inleads may be turned up without being taken all the way to the outer edge of said ledge seal.

2. A sealed electric device comprising an envelope formed by a pair of vitreous plates defining an enclosure and fused together along overlapping margins to provide a vitreous ledge seal, a pair of inlead conductors sealed through said vitreous ledge seal between said overlapping margins, one of said margins being notched inwardly above said inleads to provide blind notches through which said inleads may be turned up without being taken all the way to the outer edge of said ledge seal.

3. A sealed evacuated electric device comprising an envelope formed by a pair of vitreous plates defining an enclosure and fused together along their overlapping margins to provide a vitreous ledge seal, a pair of inlead conductors sealed through said vitreous ledge seal between said overlapping margins, one of said margins being notched inwardly above said inleads to provide blind notches through which said inleads may be turned up without being taken all the way to the outer edge of said ledge seal, said inleads having intermediate dumet sections with weld junctions to other sections, said dumet sections and weld junctions being embedded in glass between the inner edge of said ledge seal and the rear walls of said blind notches.

4. An electric discharge panel lamp comprising a vitreous envelope formed of a backplate and a faceplate having overlapping margins, said plates together defining a labyrinthine discharge channel, electrodes supported in the ends of said channel and an ionizable medium within said envelope, said overlapping margins providing a vitreous ledge and being sealed together in a fused solid ledge seal, inleads sealed through said ledge seal to support said electrodes, at least one of said margins forming said ledge seal being notched inwardly from the outer edge above said inleads whereby the inleads may be turned up without being taken all the way to the outer edge of said ledge seal.

5. An electric discharge panel lamp comprising a vitreous envelope formed of a backplate and a faceplate having overlapping margins, said plates together defining a labyrinthine discharge channel, electrodes supported in the ends of said channel and an ionizable medium within said envelope, said overlapping margins providing a vitreous ledge extending around said envelope and being sealed together in a fused solid ledge seal, inleads sealed through said ledge seal to support said electrodes, each of said inleads comprising an intermediate dumet section welded to the other sections, at least one of said margins forming said ledge seal being notched inwardly from the outer edge above said inleads whereby the inleads may be turned up through said notches without being taken all the way to the outer edge of said ledge seal, the dumet section and the weld junctions of said inleads being embedded entirely in said ledge seal between its inner edge and the rear walls of said notches.

6. An electric discharge panel lamp comprising a vitreous envelope formed of a backplate and a faceplate having overlapping margins, said backplate having a plurality of parallel interconnected grooved channelways formed therein to define a labyrinthine discharge channel, electrodes supported in the ends of said channel and an ionizable medium within said envelope, said overlapping margins providing a vitreous ledge extending around said envelope and being sealed together in a fused solid ledge seal, inleads sealed through said ledge seal to support said electrodes, each of said inleads comprising an intermediate dumet section welded to the other sections, one of said margins forming said ledge seal being notched inwardly from the outer edge above said inleads whereby to provide in said ledge seal blind notches through which said inleads emerge, the dumet sections and the weld junctions of said inleads being embedded entirely in said ledge seal between its inner edge and the rear walls of said blind notches.

References Cited by the Examiner

UNITED STATES PATENTS

| 2,543,093 | 2/1951 | Braunsdorff | 313—115 |
| 2,555,749 | 6/1951 | Krefft | 313—109 |
| 2,845,557 | 7/1958 | Gottschalk | 313—332 X |
| 3,061,762 | 10/1962 | Schlegel. | |
| 3,130,356 | 4/1964 | Weller | 317—261 |

FOREIGN PATENTS 959,678  10/1949  France.

GEORGE N. WESTBY, *Primary Examiner.*

RALPH G. NILSON, *Examiner.*